US008983488B2

(12) United States Patent
Sweeney et al.

(10) Patent No.: US 8,983,488 B2
(45) Date of Patent: Mar. 17, 2015

(54) SYSTEM AND METHOD FOR PROVIDING LOCATION BASED SERVICES AT A SHOPPING FACILITY

(75) Inventors: Jeffrey Sweeney, Olathe, KS (US); Kelsyn Rooks, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 501 days.

(21) Appl. No.: 12/332,537

(22) Filed: Dec. 11, 2008

(65) Prior Publication Data
US 2010/0151821 A1 Jun. 17, 2010

(51) Int. Cl.
*H04W 24/00* (2009.01)
*H04W 4/02* (2009.01)
*H04M 1/725* (2006.01)
*H04W 8/18* (2009.01)
*H04W 60/00* (2009.01)

(52) U.S. Cl.
CPC ............ *H04W 4/02* (2013.01); *H04M 1/72572* (2013.01); *H04W 8/18* (2013.01); *H04W 24/00* (2013.01); *H04W 60/00* (2013.01)
USPC .................. 455/456.1; 455/404.2; 455/456.5; 455/457; 705/14.4; 705/14.41; 705/14.49; 705/14.52; 705/14.53; 705/14.56; 705/14.57; 705/14.58

(58) Field of Classification Search
CPC .............. G06Q 30/02; G06Q 30/0241; G06Q 30/0259; G06Q 30/0261; G06Q 30/0267; G06Q 30/0269
USPC ............. 455/414.1–414.4, 466, 404.1–404.2, 455/456.1–456.6, 457; 705/14.4, 705/14.41–14.49, 14.5, 14.51–14.59, 14.6, 705/14.61–14.69, 14.7, 14.71–14.73
See application file for complete search history.

(56) References Cited

U.S. PATENT DOCUMENTS

| | | | |
|---|---|---|---|
| 4,598,275 | A | 7/1986 | Ross et al. |
| 4,814,751 | A | 3/1989 | Hawkins et al. |
| 5,301,353 | A | 4/1994 | Borras et al. |
| 6,057,764 | A | 5/2000 | Williams |
| 6,259,405 | B1 | 7/2001 | Stewart et al. |
| 6,327,535 | B1 | 12/2001 | Evans et al. |
| 6,331,817 | B1 | 12/2001 | Goldberg |
| 6,396,413 | B2 | 5/2002 | Hines et al. |
| 6,531,963 | B1 | 3/2003 | Nyfelt |
| 6,774,811 | B2 | 8/2004 | Kaufman et al. |
| 6,894,612 | B2 | 5/2005 | Xydis |

(Continued)

OTHER PUBLICATIONS

U.S. Appl. No. 12/499,412; Non-Final Rejection dated Sep. 26, 2012; 35 pages.

(Continued)

*Primary Examiner* — Rafael Pérez-Gutiérrez
*Assistant Examiner* — Thai Vu
(74) *Attorney, Agent, or Firm* — Swanson & Bratschun, L.L.C.

(57) ABSTRACT

Embodiments of the disclosed invention include a system and a method for providing location-based services to consumers of a shopping facility. In one embodiment, a consumer creates a user account, user profile, and registers one or mobile devices. The system monitors for the presence of the registered mobile devices within one or more shopping facilities. The system transmits advertising material corresponding to the user created profile to a detected registered mobile device in response to the registered mobile device being within a specified range of a store associated with the user created profile.

16 Claims, 6 Drawing Sheets

(56) References Cited

U.S. PATENT DOCUMENTS

| | | |
|---|---|---|
| 6,917,288 B2 | 7/2005 | Kimmel et al. |
| 6,963,277 B2 | 11/2005 | Imasaki et al. |
| 6,968,179 B1 | 11/2005 | De Vries |
| 7,102,509 B1 | 9/2006 | Anders et al. |
| 7,120,135 B2 | 10/2006 | Kim |
| 7,123,126 B2 | 10/2006 | Tanaka et al. |
| 7,132,941 B2 | 11/2006 | Sherlock |
| 7,138,920 B2 | 11/2006 | Nyfelt |
| 7,142,122 B2 | 11/2006 | Butikofer et al. |
| 7,149,297 B2 | 12/2006 | Idoni et al. |
| 7,167,094 B2 | 1/2007 | Ciarcia et al. |
| 7,203,674 B2 | 4/2007 | Cohen |
| 7,218,930 B2 | 5/2007 | Ko et al. |
| 7,275,689 B2 | 10/2007 | Mak |
| 7,286,158 B1 | 10/2007 | Griebenow |
| 7,286,837 B2 | 10/2007 | Giniger et al. |
| 7,319,386 B2 | 1/2008 | Collins et al. |
| 7,366,522 B2 | 4/2008 | Thomas |
| 7,382,895 B2 | 6/2008 | Bramblet et al. |
| 7,386,595 B1 | 6/2008 | Bloomer et al. |
| 7,426,197 B2 | 9/2008 | Schotten et al. |
| 7,433,648 B2 | 10/2008 | Bridgelall |
| 7,454,203 B2 | 11/2008 | Levitan |
| 7,460,020 B2 | 12/2008 | Reyes et al. |
| 7,495,551 B2 | 2/2009 | Waxman et al. |
| 7,495,562 B2 | 2/2009 | Monroe |
| 7,504,940 B2 | 3/2009 | Luebke et al. |
| 7,505,607 B2 | 3/2009 | Meunier et al. |
| 7,508,310 B1 | 3/2009 | Light et al. |
| 7,515,043 B2 | 4/2009 | Welch et al. |
| 7,554,446 B2 | 6/2009 | Ciarcia et al. |
| 7,561,019 B2 | 7/2009 | Sasakura et al. |
| 7,592,909 B2 | 9/2009 | Zaruba et al. |
| 7,634,283 B2 | 12/2009 | Luebke |
| 7,671,728 B2 | 3/2010 | Buehler |
| 7,693,512 B1 | 4/2010 | West |
| 7,739,340 B2 | 6/2010 | Arenburg et al. |
| 7,751,829 B2 | 7/2010 | Masuoka et al. |
| 7,801,975 B2 | 9/2010 | Stykes |
| 7,844,055 B2 | 11/2010 | Mukherjee et al. |
| 7,898,419 B2 | 3/2011 | Cristache |
| 7,907,955 B2 | 3/2011 | Virk et al. |
| 7,984,105 B2 | 7/2011 | Griffin |
| 8,040,219 B2 | 10/2011 | Haartsen et al. |
| 8,041,586 B2 | 10/2011 | Jethani et al. |
| 8,064,928 B2 | 11/2011 | Venkatachalam |
| 8,091,778 B1 | 1/2012 | Block et al. |
| 8,102,238 B2 | 1/2012 | Golander et al. |
| 8,331,931 B2 | 12/2012 | Whitesell et al. |
| 8,428,620 B2 | 4/2013 | Sweeney et al. |
| 8,655,693 B2 | 2/2014 | Gupta |
| 8,791,817 B2 | 7/2014 | Sweeney et al. |
| 2001/0001239 A1 | 5/2001 | Stewart |
| 2001/0046215 A1 | 11/2001 | Kim |
| 2002/0077077 A1 | 6/2002 | Rezvani et al. |
| 2002/0091569 A1* | 7/2002 | Kitaura et al. ................. 705/14 |
| 2002/0104012 A1 | 8/2002 | Xydis |
| 2002/0156787 A1 | 10/2002 | Jameson et al. |
| 2002/0193973 A1 | 12/2002 | Kinoshita et al. |
| 2003/0197612 A1 | 10/2003 | Tanaka et al. |
| 2003/0210148 A1 | 11/2003 | Imasaki et al. |
| 2004/0198311 A1 | 10/2004 | Aerrabotu et al. |
| 2004/0225681 A1 | 11/2004 | Chaney et al. |
| 2004/0266421 A1 | 12/2004 | Kato et al. |
| 2005/0101335 A1 | 5/2005 | Kelly et al. |
| 2005/0206518 A1 | 9/2005 | Welch et al. |
| 2005/0280535 A1 | 12/2005 | Gary, Jr. |
| 2006/0015376 A1 | 1/2006 | Sattler et al. |
| 2006/0015491 A1 | 1/2006 | Lee et al. |
| 2006/0031326 A1 | 2/2006 | Ovenden |
| 2006/0063540 A1 | 3/2006 | Beuck |
| 2006/0075038 A1 | 4/2006 | Mason et al. |
| 2006/0105751 A1 | 5/2006 | Bloom |
| 2006/0155591 A1 | 7/2006 | Altaf et al. |
| 2006/0184417 A1 | 8/2006 | Van der Linden et al. |
| 2006/0230137 A1 | 10/2006 | Gare et al. |
| 2006/0270419 A1 | 11/2006 | Crowley et al. |
| 2006/0278702 A1 | 12/2006 | Sakai |
| 2007/0001835 A1 | 1/2007 | Ward et al. |
| 2007/0001841 A1 | 1/2007 | Anders et al. |
| 2007/0069884 A1 | 3/2007 | Waxman |
| 2007/0096871 A1 | 5/2007 | Mason et al. |
| 2007/0100704 A1* | 5/2007 | Liu et al. ................. 705/26 |
| 2007/0136140 A1* | 6/2007 | Smith, Jr. ................. 705/26 |
| 2007/0162315 A1 | 7/2007 | Hodges |
| 2007/0273474 A1 | 11/2007 | Levine |
| 2008/0014947 A1 | 1/2008 | Carnall |
| 2008/0059254 A1 | 3/2008 | Vivadelli et al. |
| 2008/0068162 A1 | 3/2008 | Sharma et al. |
| 2008/0129444 A1 | 6/2008 | Nashimi |
| 2008/0153511 A1 | 6/2008 | Mock |
| 2008/0162198 A1 | 7/2008 | Jabbour et al. |
| 2008/0182590 A1* | 7/2008 | Ruckart et al. ............. 455/456.3 |
| 2008/0195457 A1* | 8/2008 | Sherman et al. ................. 705/10 |
| 2008/0270238 A1 | 10/2008 | Zweben et al. |
| 2008/0287142 A1* | 11/2008 | Keighran ................. 455/456.5 |
| 2008/0291013 A1 | 11/2008 | McCown et al. |
| 2009/0005069 A1 | 1/2009 | McAlexander |
| 2009/0018996 A1* | 1/2009 | Hunt et al. ................. 707/2 |
| 2009/0022131 A1 | 1/2009 | Rusanen et al. |
| 2009/0058638 A1 | 3/2009 | Kanaglia et al. |
| 2009/0106077 A1 | 4/2009 | Bhogal et al. |
| 2009/0119400 A1 | 5/2009 | Fukazawa |
| 2009/0148827 A1 | 6/2009 | Argott |
| 2009/0163224 A1* | 6/2009 | Dean et al. ................. 455/456.1 |
| 2009/0186611 A1 | 7/2009 | Stiles et al. |
| 2009/0215469 A1 | 8/2009 | Fisher et al. |
| 2009/0219156 A1 | 9/2009 | August et al. |
| 2009/0222324 A1* | 9/2009 | Johnson ................. 705/10 |
| 2009/0237203 A1 | 9/2009 | Determan et al. |
| 2009/0273441 A1 | 11/2009 | Mukherjee |
| 2009/0298514 A1 | 12/2009 | Ullah |
| 2009/0307096 A1 | 12/2009 | Antonellis |
| 2010/0015993 A1 | 1/2010 | Dingler et al. |
| 2010/0090827 A1 | 4/2010 | Gehrke et al. |
| 2010/0097214 A1 | 4/2010 | Sweeney et al. |
| 2010/0106748 A1 | 4/2010 | Schultz et al. |
| 2010/0109864 A1 | 5/2010 | Haartsen et al. |
| 2010/0114613 A1 | 5/2010 | Smith et al. |
| 2010/0146499 A1 | 6/2010 | Bush et al. |
| 2010/0161432 A1 | 6/2010 | Kumanov et al. |
| 2010/0267399 A1 | 10/2010 | Sweeney et al. |
| 2010/0273509 A1 | 10/2010 | Sweeney et al. |
| 2010/0277315 A1 | 11/2010 | Cohn et al. |
| 2010/0283579 A1 | 11/2010 | Kraus et al. |
| 2010/0318615 A1 | 12/2010 | Griffin |
| 2010/0332268 A1 | 12/2010 | Ohmori et al. |
| 2011/0010218 A1 | 1/2011 | Gupta |
| 2011/0128145 A1 | 6/2011 | Todd et al. |
| 2011/0173263 A1 | 7/2011 | Beers et al. |

OTHER PUBLICATIONS

U.S. Appl. No. 12/428,051; Non-Final Rejection dated Aug. 2, 2012; 36 pages.

U.S. Appl. No. 12/256,359; Final Rejection dated Sep. 13, 2011; 13 pages.

U.S. Appl. No. 12/256,359; Non-Final Rejection dated Mar. 18, 2011; 12 pages.

U.S. Appl. No. 12/424,178 Non-Final Rejection dated Jul. 1, 2011; 15 pages.

U.S. Appl. No. 12/424,178; Final Office Action dated Dec. 28, 2011; 20 pages.

U.S. Appl. No. 12/424,178; Notice of Panel Decision from Pre-Appeal Brief Review dated May 3, 2012; 2 pages.

U.S. Appl. No. 12/428,051; Final Rejection dated Feb. 23, 2012; 19 pages.

U.S. Appl. No. 12/428,051; Non-Final Rejection dated Sep. 23, 2011; 21 pages.

U.S. Appl. No. 12/499,412; Requirement for Restriction/Election dated Apr. 27, 2012; 7 pages.

U.S. Appl. No. 12/256,359; Non-Final Rejection dated May 24, 2012; 35 pages.

(56) References Cited

OTHER PUBLICATIONS

U.S. Appl. No. 12/428,051; Notice of Allowance dated Dec. 3, 2012; 25 pages.
U.S. Appl. No. 12/428,051; Notice of Allowance dated Dec. 28, 2012; 27 pages.
U.S. Appl. No. 12/256,359; Final Rejection dated Dec. 11, 2012; 35 pages.
"Resource Scheduling in Hoteling Environments," published by www.peoplecube.com via web.archive.org on Jul. 21, 2008, pp. 1-3 of 3.
U.S. Appl. No. 12/424,178 Non-Final Rejection dated Mar. 18, 2013; 43 pages.
U.S. Appl. No. 12/428,051; Issue Notification dated Apr. 3, 2013; 1 page.
U.S. Appl. No. 12/499,412; Final Rejection dated Apr. 26, 2013; 22 pages.
U.S. Appl. No. 12/256,359; Non-Final Rejection dated Sep. 10, 2013; 42 pages.
U.S. Appl. No. 12/424,178 Non-Final Rejection dated Sep. 26, 2013; 38 pages.
U.S. Appl. No. 12/499,412; Notice of Allowance dated Oct. 11, 2013; 41 pages.
U.S. Appl. No. 12/256,359; Interview Summary dated Jan. 14, 2014; 3 pages.
U.S. Appl. No. 12/256,359; Notice of Allowance dated Mar. 18, 2014; 20 pages.
U.S. Appl. No. 12/499,412; Issue Notification dated Jan. 29, 2014; 1 page.
U.S. Appl. No. 12/256,359; Issue Notification dated Jul. 9, 2014; 1 page.
U.S. Appl. No. 12/424,178; Final Rejection dated May 27, 2014; 48 pages.
U.S. Appl. No. 12/424,178 Non-Final Rejection dated Oct. 7, 2014; 51 pages.

\* cited by examiner

SYSTEM AND METHOD FOR PROVIDING LOCATION BASED SERVICES AT A SHOPPING FACILITY

BACKGROUND OF THE INVENTION

A location-based service (LBS) is a service that utilizes the geographical position of a mobile device to provide information and entertainment services. For example, location based services include, identifying a location of a person or object, such as, discovering the neatest automatic teller machine or the whereabouts of an employee. Other examples of location-based services include parcel tracking, personalized weather services, and even location-based games.

SUMMARY

Embodiments of the disclosed invention include a system and a method for providing location-based services to consumers of a shopping facility. In one embodiment, the method includes registering a mobile device associated with a consumer for the location-based services. The method creates a user profile that includes a plurality of stores and interests associated with the consumer. The method monitors for the presence of the mobile device in a shopping facility using a plurality of femto cells placed at different areas of the shopping facility. In response to detecting the mobile device within the shopping facility, the method determines if the mobile device is within a specified range of a user-specified store in the shopping facility by triangulating the signal of the mobile device using the plurality of femto cells. In response to the mobile device being within the specified range of the store in the shopping facility, the method retrieves advertising information associated with the store from a marketing database. The method then transmits the advertising information to the mobile device.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
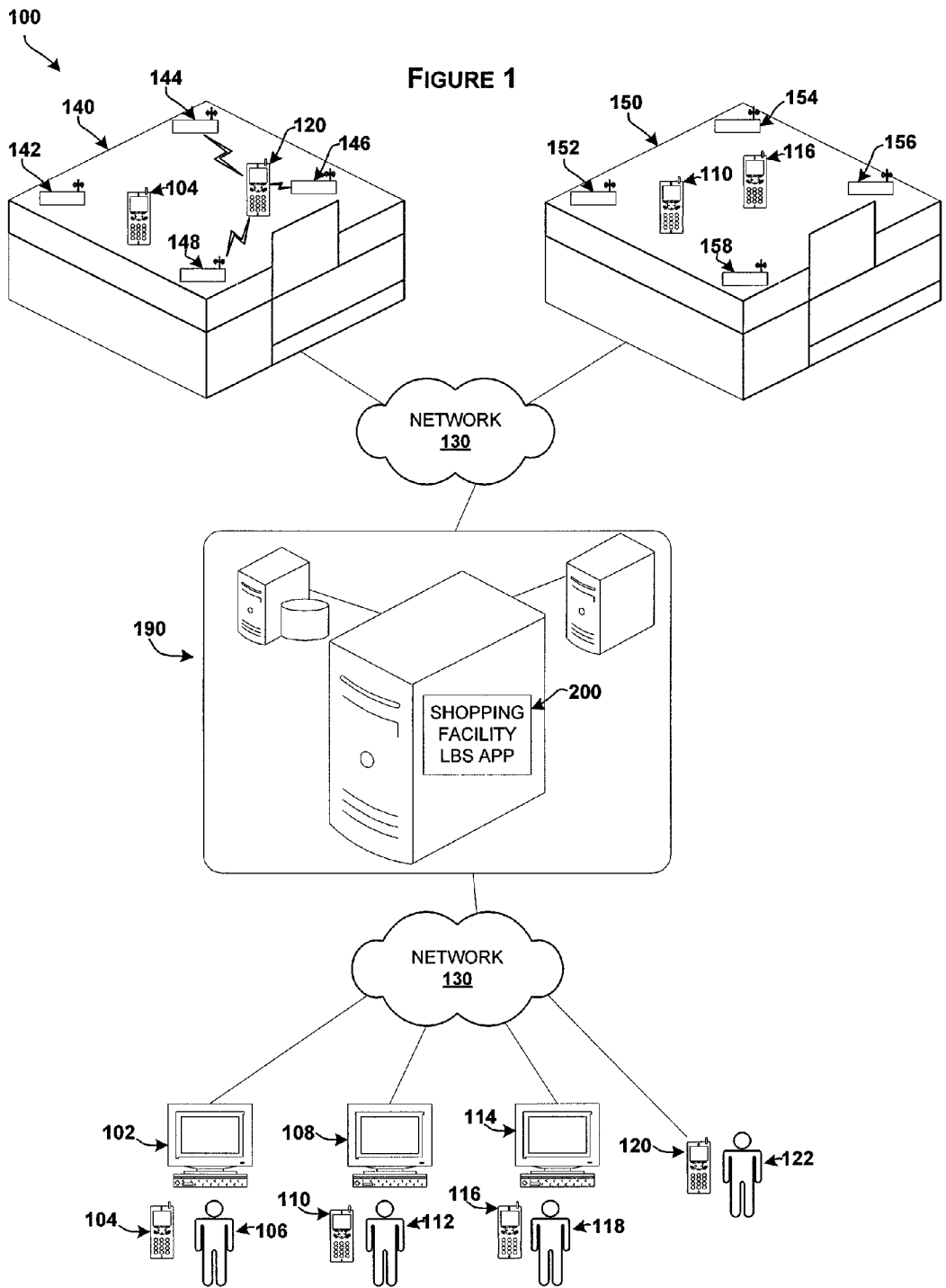
FIG. 1 depicts an embodiment of a network environment in which the illustrative embodiments may be implemented.

FIG. 1 depicts a network environment 100 in which the illustrative embodiments may be implemented for providing location-based services to consumers of a shopping facility. In the depicted embodiment, a set of data processing systems 190 executes a shopping facility location-based services application 200 for providing location-based services to consumers, such as, but not limited to, consumers 106, 112, 118, and 122 of a shopping facility, such as, but not limited to, shopping facility 140 and shopping facility 150. As referenced herein, the term "set" is defined as one or more. Accordingly, the set of data processing systems 190 may comprise one or more data processing systems. For example, in some embodiments, set of data processing systems 190 may include a Web server, an application server, and/or a database server interconnected via a data network, such as, but not limited to, the Internet, to execute the functionalities associated with shopping facility location-based services application 200. For instance, a Web server may handle the HTTP requests and generates a response, most often in HTML, for viewing in a Web browser. An application server may provide access to the business logic for use by client application programs running on a PC, a Web server, or even other application servers. A database server may provide database services to other computer programs or computers, such as, but not limited to, a PC, a Web server, or even other application servers.

Additionally, the set of data processing systems 190 may communicate to each other and/or other data processing systems via network 130. In one embodiment, network 130 is the Internet. The Internet is a global system of interconnected computer networks that interchange data using the standardized Internet Protocol Suite (TCP/IP). The Internet includes millions of private and public networks that are linked by copper wires, fiber-optic cables, wireless connections, and other technologies. In some embodiments, network 130 may also include a number of different types of networks, such as, but not limited to, an intranet, a local area network (LAN), or a wide area network (WAN).

In one embodiment, consumers 106, 112, 118, and 122 respectively utilize data processing systems 102, 108, 114, and mobile communication device 120 to access a Web site/portal to create a user account with shopping facility location-based services application 200. Mobile communication device 120 may be any type of wireless communication device, such as, but not limited to, a cellular phone, a personal digital assistant (PDA), and/or a wireless laptop capable of accessing network 130. As will be further described, in conjunction with creating a user account, consumers 106, 112, 118, and 122 creates a user profile and registers one or more mobile devices, such as, but not limited to, mobile devices 104, 110, 116, and 120, respectively associated with consumers 106, 112, 118, and 122 to provide location-based services to the registered mobile devices. For example, in one embodiment, the user profile may include a plurality of stores and/or interest associated with a consumer.

According to one embodiment, shopping facility location-based services application 200, executed by the set of data processing systems 190, monitors for the presence of a registered mobile device in one or more shopping facilities, such as, but not limited to, shopping facility 140 and shopping facility 150. For example, in one embodiment, shopping facility location-based services application 200 uses a plurality of femto cells, such as, but not limited to, 142, 144, 146, 148, 152, 154, 156, and 158 placed in different areas of a shopping facility. In some embodiments, shopping facility 140 and shopping facility 150 may be an indoor mall/shopping facility, an outdoor mall, and/or a strip mall.

Femto cells 142, 144, 146, 148, 152, 154, 156, and 158 are wireless transmission devices used to improve mobile network coverage in small areas. Femto cells 142, 144, 146, 148, 152, 154, 156, and 158 connect mobile devices through their normal GSM, CDMA, or UMTS connections, and then route the connections over a broadband internet connection back to the carrier, bypassing the normal cell towers. In addition, in some embodiments, femto cells 142, 144, 146, 148, 152, 154, 156, and 158 may detect other wireless signals, such as, but not limited to, Wi-Fi, and Bluetooth signals and/or other wireless signals, such as, signals utilizing the Wireless Application Protocol (WAP) for providing secure data transmission.

In the depicted embodiment, femto cells 142, 144, 146, and 148 detect the presence of mobile devices 104 and 120 in shopping facility 140. The location of mobile devices 104 and 120 within shopping facility 140 may be determined by using femto cells 142, 144, 146, and 148 to triangulate the signals transmitted by mobile devices 104 and 120. Triangulation is a process by which the location of a wireless communication device may be determined by measuring either the radial distance, or the direction, of the received signal from two or three different transceiver stations. For example, in one embodiment, femto cells 144, 146, and 148 detect the presence of mobile device 120 and triangulates the signal transmitted by mobile device 120 to determine the location of mobile device 120 within shopping facility 140. In one embodiment, femto cells 144, 146, and 148 transmits the location information of mobile device 120 to shopping facility location-based services application 200 via network 130. Alternatively, in some embodiments, femto cells 144, 146, and 148 may transmit the raw location data to shopping facility location-based services application 200 and shopping facility location-based services application 200 determines the location of mobile device 120 within shopping facility 140 using the raw location data.

In accordance with some embodiments, shopping facility location-based services application 200 is configured with retail information, such as, but not limited to, the location of a retail store within a particular shopping facility and the type of merchandise associated with a particular retail store. As referenced herein, the term "store" includes retail stores, restaurants, and other consumer service businesses. Using the store information and the location information of a mobile device within a shopping facility, shopping facility location-based services application 200 determines whether the mobile device is within a specified range of a store associated with a user profile corresponding to the detected mobile device. The specified range may be preconfigured by a systems administrator or, in some embodiments, may be user configurable via a website/portal. In response to detecting a mobile device within a specified range of a store associated with a user profile, shopping facility location-based services application 200 retrieves advertising material/information, such as, but not limited to, electronic coupons and/or advertisements, associated with the particular store and transmits the advertising material to the mobile device.

Further, in some embodiments, shopping facility location-based services application 200 may handle user-generated requests for advertising material/information. For example, in one embodiment, in response to receiving a user-generated request, shopping facility location-based services application 200 determines the location of the requesting mobile device within a shopping facility, and retrieves and transmits advertising material associated with retail stores/restaurants near the requesting mobile device. Additionally, in some embodiments, user-generated requests for advertising material may include advertising material associated with retail stores/restaurants located outside of a shopping facility. For example, in some embodiments, shopping facility location-based services application 200 may retrieve/receive global positioning coordinates associated with a requesting mobile communication device and/or triangulate the signal of the requesting mobile communication device using cell towers of a macro communication network to determine the location of the mobile communication device outside a shopping facility.

In addition, as will be further described, in some embodiments, shopping facility location-based services application 200 may provide an additional measure of security at a shopping facility. For example, in one embodiment, shopping facility location-based services application 200 identifies a subscriber associated with a detected mobile device within a shopping facility and searches for criminal records associated with the identified subscriber. In one embodiment, based on the type of criminal records found, security personnel at the shopping facility may be notified.

Figure 2:
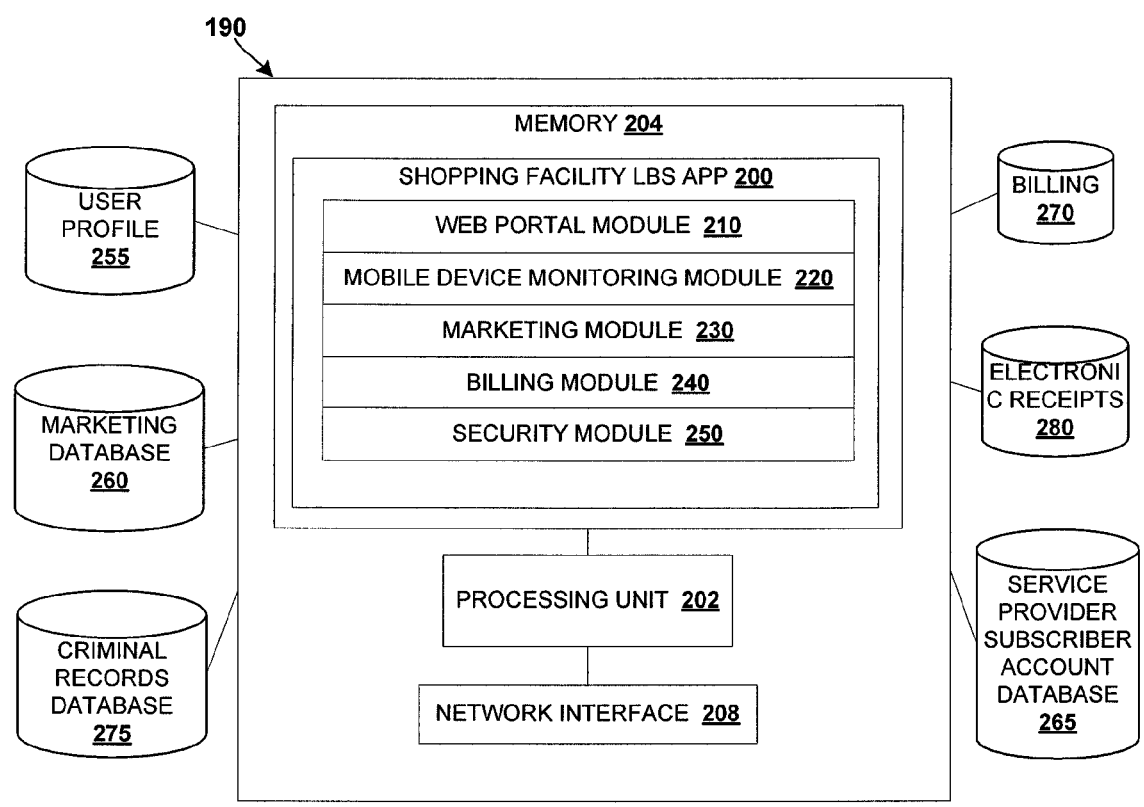
FIG. 2 depicts an embodiment of a shopping facility location-based services application in accordance with the illustrative embodiments.

FIG. 2 depicts an embodiment of shopping facility location-based services application 200 in accordance with the illustrative embodiments. Shopping facility location-based services application 200 may be executed by one or more data processing systems, such as, but not limited to, the set of data processing systems 190 depicted in FIG. 1. In the depicted embodiment, the set of data processing systems 190 comprise, at a minimum, a processing unit 202, memory 204, and a network interface 208.

Processing unit 202 may comprise of one or more microprocessors for executing computer usable program code/instructions for providing location-based services to consumers of a shopping facility. For example, processing unit 202 executes the computer executable instructions associated with shopping facility location-based services application 200 stored in memory 204. Processing unit 202 may be located on a single data processing system and/or may be multiple processors located on different data processing systems execute serially and/or in parallel for providing location-based services to consumers of a shopping facility in accordance with the disclosed embodiments.

Memory 204 is a data storage component of the set of data processing systems 190. Memory 204 maybe located on one or more data processing systems. In some embodiments, memory 204 may include both volatile and non-volatile memory. Volatile memory is memory that loses its contents when the computer or hardware device loses power. For example, in some embodiments, memory 204 may be random access memory (RAM). Random access memory stores currently executing instructions and/or data utilized by an operating system, software program, hardware device, and/or a user. Non-volatile memory, such as, but not limited to, a hard disk drive, retains stored data without a power source.

Network interface 208 enables the set of data processing systems 190 to communicate over a network, such as, but not limited to, network 130. In some embodiments, network interface 208 is an Ethernet card. Alternatively, in some embodiments, network interface 208 may be an embedded component, i.e., part of the main circuit board/motherboard. Additionally, in some embodiments, network interface 208 may also include wireless capabilities.

In the depicted embodiment, shopping facility location-based services application 200 includes, among other components, a web portal module 210, a mobile device monitoring module 220, a marketing module 230, a billing module 240, and a security module 250. In addition, as will be further discussed, shopping facility location-based services application 200 may interact with one or more local or remote databases and/or data processing systems for providing location-based services to consumers of a shopping facility.

Web portal module 210 comprises computer executable instructions for providing a website/portal user interface to enable a consumer to create a user account with shopping facility location-based services application 200. In one embodiment, in conjunction with creating a user account, a consumer selects one or more stores and/or interests that the consumer desires to receive marketing material. In addition, the consumer registers one or more mobile devices with shopping facility location-based services application 200. In some embodiments, web portal module 210 stores the user account information in a database, such as, but not limited to, user profile database 255.

Mobile device monitoring module 220 comprises computer executable instructions for monitoring one or more shopping facilities for detecting a registered mobile device within a shopping facility. For example, in one embodiment, mobile device monitoring module 220 continuously receives mobile device information from shopping facility 140 either directly from femto cells 142, 144, 146, and 148 or from a central data processing system located at shopping facility 140. Mobile device monitoring module 220 processes the mobile device information from shopping facility 140 to determine whether a registered mobile device is within shopping facility 140.

Marketing module 230 comprises computer executable instructions for retrieving and storing marketing/advertising information in a database, such as, but not limited to, marketing database 260. In one embodiment, a company may create a business account with shopping facility location-based services application 200 and upload advertising information for consumers into marketing database 260. In some embodiments, in response to detecting a registered mobile device within a shopping facility, marketing module 230 retrieves the user profile corresponding to the detected registered mobile device. Marketing module 230 uses the user profile to retrieve marketing information associated with stores and/or interests associated with the user profile. Marketing module 230 transmits the retrieved marketing information to the detected mobile device via network interface 208. In addition, in some embodiments, marketing module 230 may comprise computer executable instructions for generating a market analysis report using demographics, such as, but not limited to, gender, age, race, and income, associated with the user account using data associated with products/services purchased by a consumer.

Additionally, in some embodiments, marketing module 230 may also communicate with a store's inventory system. For example, in some embodiments, a store may advertise a particular item and the number of those items that are in stock. In other embodiments, a user desiring a particular product, such as, the latest hard to find gadget, may be notified when the item is in stock at a particular store, the quantity that is available, or when a shipment of the item is expected.

Billing module 240 comprises computer executable instructions for billing an advertiser. For example, in some embodiments, billing module 240 charges a fee to an advertiser, i.e., a company associated with a store, for placing marketing/advertising material in marketing database 260 for dissemination to consumers. Alternatively, in some embodiments, billing module 240 charges a fee to an advertiser when marketing material, such as, but not limited to, an electronic coupon disseminated by shopping facility location-based services application 200 is used to purchase at least one item from a particular store. In these embodiments, the advertisement fee may be a flat fee or may be a percentage of a sale associated with the use of an electronic coupon. In some embodiments, billing information may be stored in one or more databases, such as, but not limited to, billing database 270.

Additionally, in some embodiments, billing module 240 may store an electronic copy of the sales receipt associated with the electronic coupon purchase in an electronic receipts database 280. For example, in one embodiment, a data processing system associated with the store sends an electronic copy of the sales receipt to shopping facility location-based services application 200 in response to the store using an electronic coupon. The electronic receipt may be used by shopping facility location-based services application 200 to bill the advertisers. In addition, in some embodiments, a consumer may query and retrieve an electronic receipt from electronic receipts database 280 for returning/exchanging an item purchased using the electronic coupon. For example, in one embodiment, consumer 106 may use data processing system 102 to access shopping facility location-based services application 200 via a web portal to search and retrieve a particular receipt. Alternatively, in some embodiments, consumer 106 may use a registered mobile device to request an electronic receipt. In these embodiments, shopping facility location-based services application 200 may transmit the electronic receipt to the mobile device and/or to a particular store.

Security module 250 comprises computer executable instructions for providing an additional security measure at a shopping facility. In one embodiment, security module 250 receives signals transmitted by mobile devices within a shopping facility using one or more femto cells placed at different areas of the shopping facility. Security module 250 extracts an identifier associated with a received mobile device signal, such as, but not limited to, mobile identification number and/or a subscriber identity module (SIM) card number for identifying the mobile device. In some embodiments, security module 250 communicates with a service provider subscriber account database 265 to identify a subscriber associated with the mobile device. In other embodiments, security module 250 may perform a reverse phone lookup. For example, in some embodiments, security module 250 may use an online telephone directory to identify a subscriber associated with the mobile device. Using the subscriber information, security module 250 searches a criminal records database 275 for any criminal records associated with the subscriber. For example, in some embodiments, criminal records database 275 may include, but is not limited to, a state's sex offender registry and/or public criminal records. In some embodiments, if a relevant criminal record is found, such as, but not limited to, theft, e.g., shoplifting, and/or a sexual offense against a child is found, security module 250 may notify security personnel with the name and location of the offender, thus, enabling security personnel to maintain a closer eye on the individual while the individual is in the shopping facility.

Figure 3:
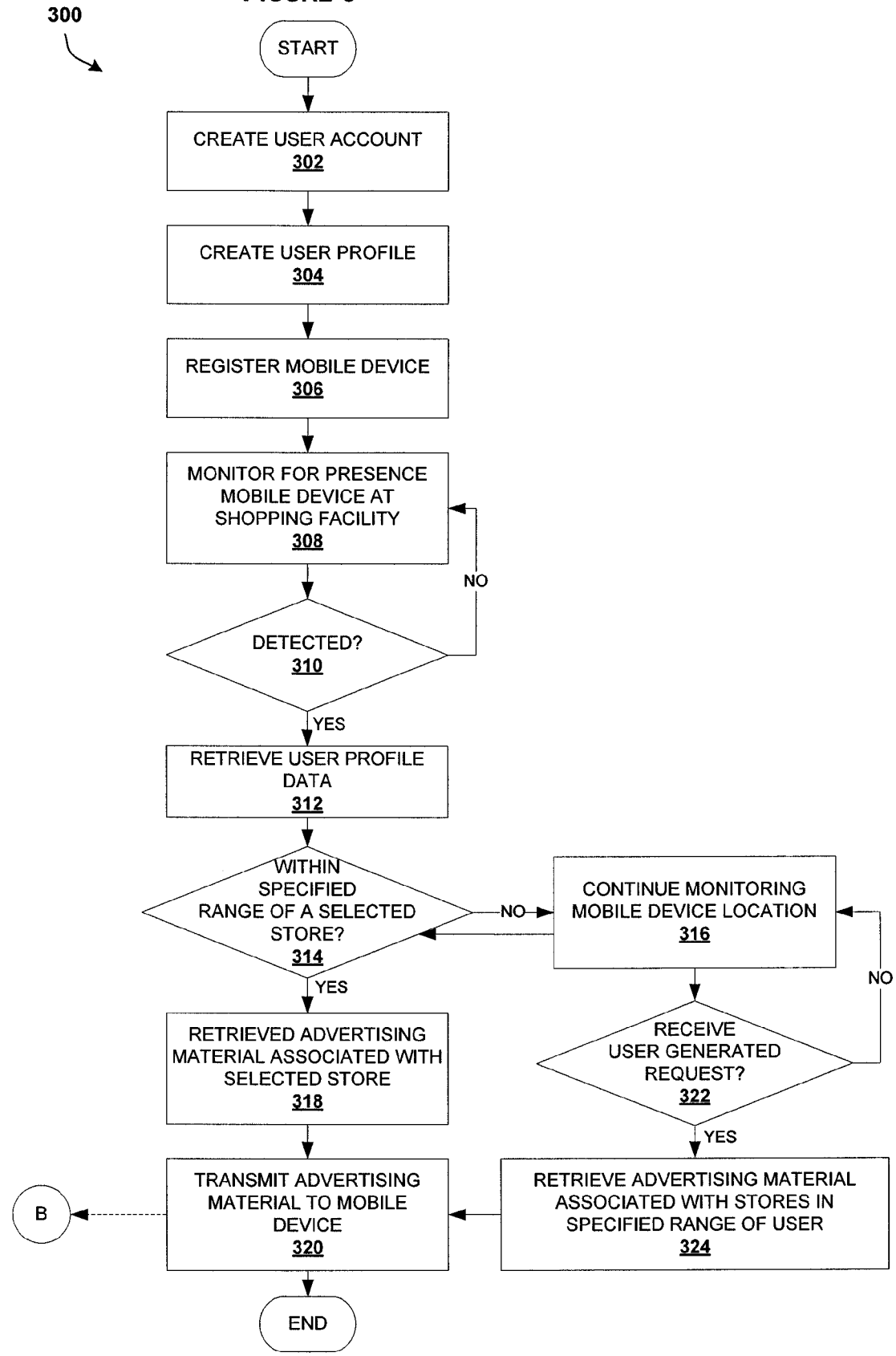
FIG. 3 depicts an embodiment of a process for providing location-based services to consumers of a shopping facility.

With reference now to FIG. 3, an embodiment of a process 300 for providing location-based services to consumers of a shopping facility is presented. Process 300 may be performed one or more data processing systems. Process 300 begins by creating a user account at step 302. For example, in one embodiment, a user creates a login name and a password. In addition to creating a user account, the process creates a user profile associated with the user account at step 304. For instance, in some embodiments, the process presents the user with a list of retail stores/restaurants or other consumer service providers to enable the user to select one or more participating stores. In addition, in some embodiments, process 300 may also enable the user to select from a predetermined list of interests/hobbies. At step 306, the process registers one or more mobile devices associated with the user. For example, in some embodiments, a user registers a phone number and/or a subscriber identity module (SIM) card number associated with a mobile device of the user. The process monitors for the presence of the registered mobile device at one or more shopping facilities at step 308. If, at step 310, the process detects a registered mobile device, the process retrieves a user profile associated with the detected registered mobile device at step 312. At step 314, the process determines whether the registered mobile device is within a specified range of a store associated with the user profile. For example, in some embodiments, the process determines whether the registered mobile device is within a specified range of a user specified store and/or within a specified range of store that sells merchandise associated with a user specified interest/hobby. If the process determines that the detected mobile device is not within the specified range of a user specified store, the process continues monitoring the mobile device location within the shopping facility at step 316. Process 300 periodically returns to step 314 to determine whether the registered mobile device is within a specified range of a user specified store.

If at step 314, the process determines that the registered mobile device is within a specified range of a user specified store, the process, at step 318, retrieves advertising material associated with the user specified store from a marketing database. In one embodiment, the advertising material may include an electronic coupon. In some embodiments, the electronic coupon may include a scannable barcode and/or a textual character code to enable the store to use the electronic coupon. In other embodiments, the advertising material may be promotional advertisements. The process transmits the advertising material to the detected mobile device at step 320, with process 300 terminating thereafter.

Additionally, in some embodiments, process 300 may receive a user-generated request for advertising material at step 322. For example, in some embodiments, if a user is located at a particular store that is not a user specified store, the user may submit a request to shopping facility location-based services application 200, to retrieve advertising materials, if any, associated with the particular store at step 324. In some embodiments, the user may specify the name and/or the location of the particular store. In other embodiments, shopping facility location-based services application 200 may be able to determine the particular store based on a determination of the mobile device location.

Figure 4:
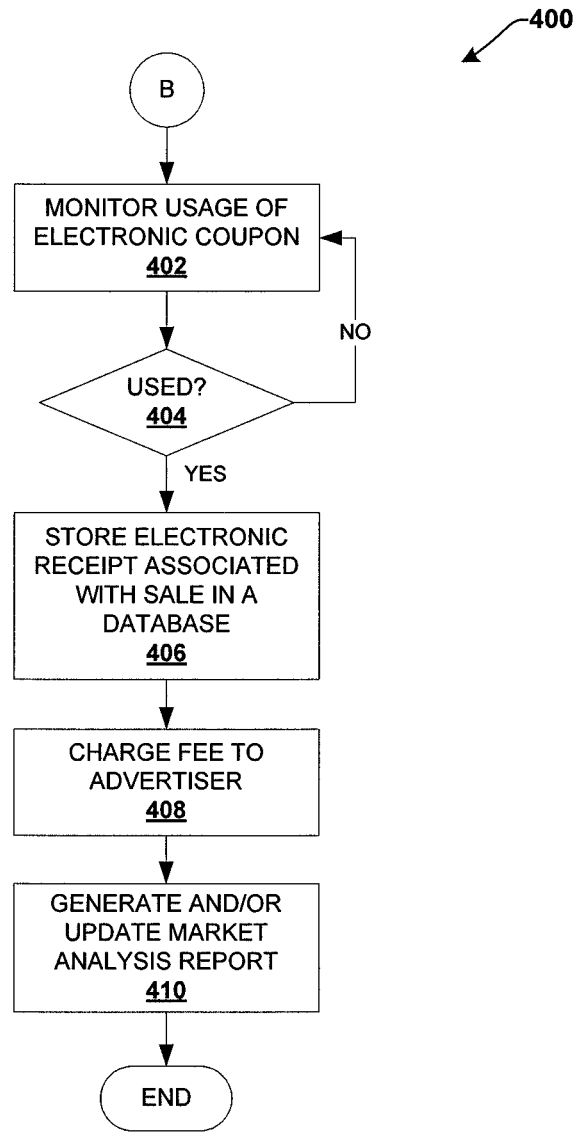
FIG. 4 depicts an embodiment of a process that provides additional features associated with an embodiment of the shopping facility location-based services application.

FIG. 4 depicts an embodiment of a process 400 that provides additional features associated with an embodiment of the shopping facility location-based services application. In some embodiments, process 400 may be performed as an expansion of process 300 as depicted in FIG. 3. Process 400 begins by monitoring for usage of an electronic coupon transmitted to a registered mobile device at step 402. At step 404, the process determines whether the electronic coupon has been used to purchase at least one item from a participating store. For example, in one embodiment, when a participating store scans/uses one of the electronic coupons transmitted by shopping facility location-based services application 200, the store transmits an acknowledgment of use back to shopping facility location-based services application 200. In some embodiments, the store may transmit an electronic receipt associated with a sale that utilized the electronic coupon to shopping facility location-based services application 200. In these embodiments, the process, at step 406, may store the electronic receipt associated with the sale in a database, such as, electronic receipts database 280.

Additionally, in some embodiments, the process, at step 408, charges a fee to a company/advertiser every time a consumer uses an electronic coupon to make a purchase. For example, in some embodiments, the fee may be a flat fee, a percentage of the sale, or, in some embodiments, a periodic fee may be charged to a company/advertiser for placing advertising material with shopping facility location-based services application 200, regardless of whether a consumer uses an electronic coupon to make a purchase.

Further, in some embodiments, at step 410, the process generates and/or updates a market analysis report based on consumer purchases and demographics. For example, in some embodiments, the market analysis report may break down the average costs of items by income level, race, and age. The market analysis report may be used to inform a particular store of the type of consumers that purchase items from their store, thus, enabling the store to target these consumers. In some embodiments, the market analysis report is provided as a free charge to participating stores/businesses. Alternatively, in some embodiments, a charge may be associated with providing the market analysis report to a participating store/business.

Figure 5:
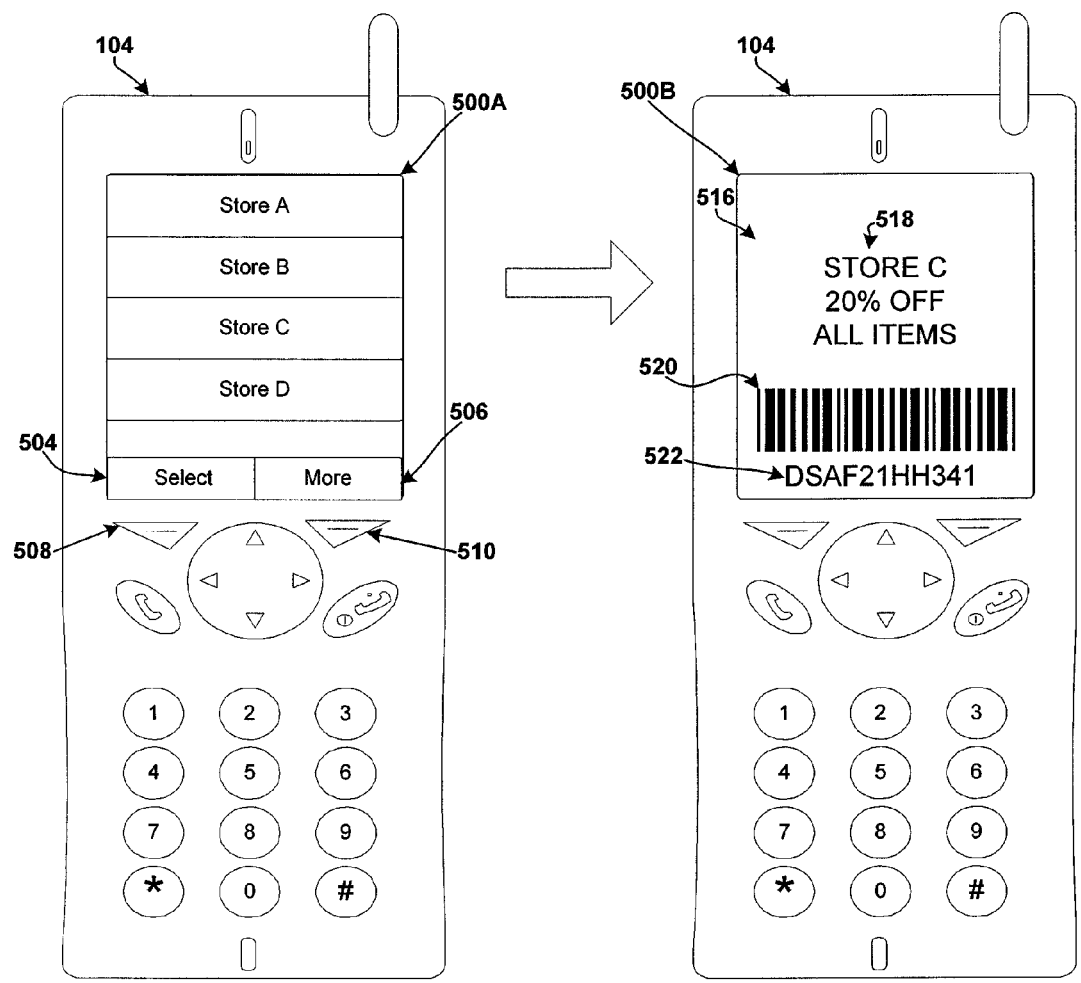
FIG. 5 depicts an embodiment of advertising information provided by the location-based services in accordance with the illustrative embodiments.

With reference now to FIG. 5, an embodiment of advertising information provided by shopping facility location-based services application 200 is presented. In the depicted embodiment, a mobile device, such as, mobile device 104, receives the advertising information. In display 500A, shopping facility location-based services application 200 transmits a list of stores, within a shopping facility, that are located within a specified range of mobile device 104. In one embodiment, display 500A may include soft keys 504 and 506 for selecting features/options associated with display 500A. For example, in some embodiments, a user may touch soft keys 504 and 506 to select a feature/option associated with display 500A. In other embodiments, soft keys 504 and 506 may be selected respectively using keys 508 and 510 on mobile device 104. For example, in one embodiment, a consumer may scroll the list of displayed stores using a navigation button 512 and using key 508 to select Store C from the list of displayed stores.

Display 500B depicts an embodiment of an electronic coupon 516 associated with store C. In the depicted embodiment, electronic coupon 516 includes a description 518 informing the consumer of an advertised special. In some embodiments, electronic coupon 516 may also include an image. For example, electronic coupon 516 may display an image of an item on sale. Additionally, in some embodiments, electronic coupon 516 may contain a scannable barcode 520. Scannable barcode 520 enables Store C's data processing systems to recognize and use electronic coupon 516. Alternatively, in some embodiments, Store C's data processing systems may use textual character code 522 to recognize and use electronic coupon 516.

Figure 6:
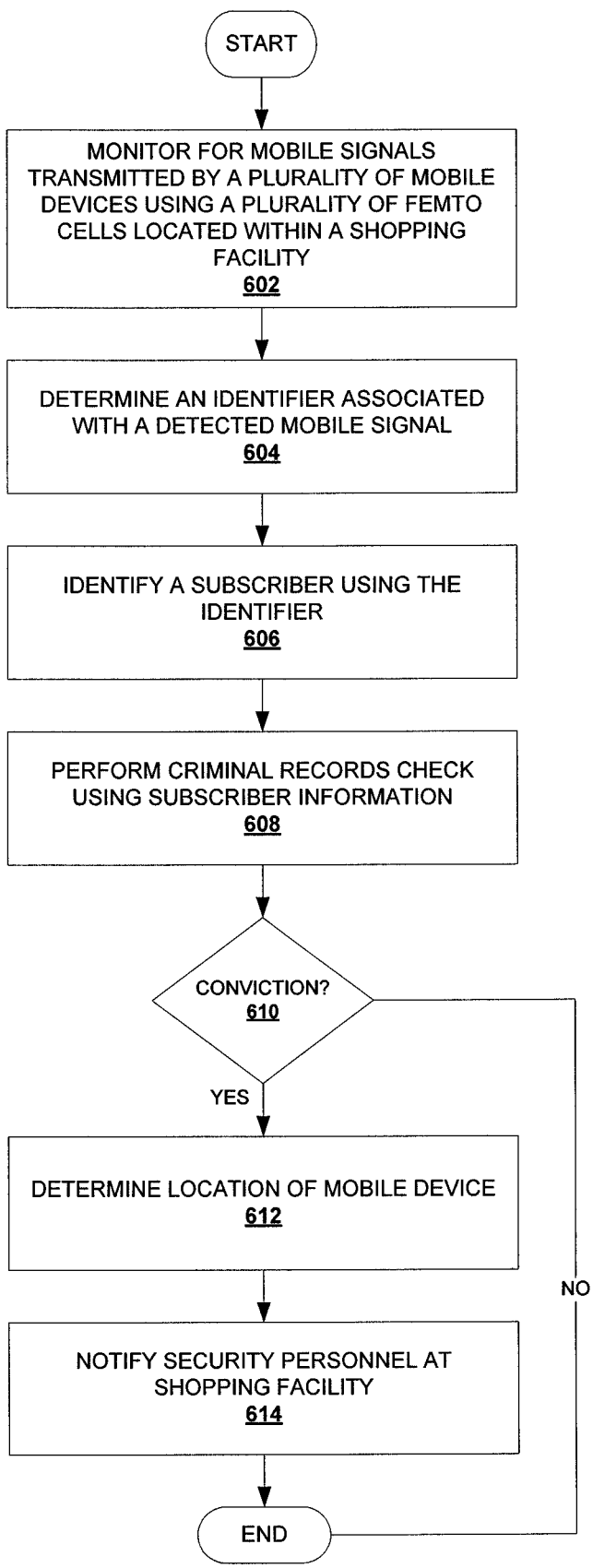
FIG. 6 depicts an embodiment of a process for providing an additional security measure at a shopping facility.

FIG. 6 depicts an embodiment of a process 600 for providing an additional security measure at a shopping facility. Process 600 begins by monitoring for cellular signals that are transmitted by a plurality of mobile devices within a shopping facility using a plurality of femto cells located within a shopping facility at step 602. At 604, the process determines an identifier, such as, but not limited to, a mobile identification number, associated with a detected cellular signal. The process identifies a subscriber associated with the mobile device using the identifier at step 606. For example, in one embodiment, the process communicates with a service provider's subscriber account database and/or perform a reverse phone lookup, to determine the identity of a subscriber associated with a mobile device. Using the subscriber data, the process, at step 608, performs a criminal records check on the subscriber. At step 610, the process determines whether the subscriber has been convicted of a relevant crime. For example, in some embodiments, process 600 may only look for particular types of crimes, such as, but not limited to, theft/shoplifting offenses and/or sexual offenses. If no conviction is found at step 610, process 600 terminates. However, if a relevant conviction is found, the process, at step 612, determines the location of the mobile device within the shopping facility using the plurality femto cells. At step 614, the process notifies security personnel at the shopping facility of the location of the mobile device, thus, enabling security personnel to be alerted of the individual. For example, in one embodiment, an email and/or text message may be sent to a security personnel at the shopping facility.

Accordingly, embodiments of the disclosed invention include a system and a method for providing location-based services to consumers at a shopping facility. In one embodiment, the method includes registering a mobile device associated with a consumer for the location-based services. The method creates a user profile that includes a plurality of stores and interests associated with the consumer. The method monitors for the presence of the mobile device in a shopping facility using a plurality of femto cells placed at different areas of the shopping facility. In response to detecting the mobile device within the shopping facility, the method determines if the mobile device is within a specified range of a store in the shopping facility by triangulating the signal of the mobile device using the plurality of femto cells, wherein the store is one of the plurality of stores associated with the user profile or is associated with an interest associated with the user profile. In response to the mobile device being within the specified range of the store in the shopping facility, the method retrieves advertising information associated with the store from a marketing database. The method then transmits the advertising information to the mobile device.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A computer implemented method for providing location based services to consumers, the computer implemented method comprising:
   registering a mobile device associated with a user for the location-based services;
   creating a user profile that includes a plurality of stores and interests associated with the user, wherein the user profile further includes demographic information associated with the user;
   monitoring for the presence of the mobile device in a shopping facility using a plurality of femto cells placed at different areas of the shopping facility;
   in response to detecting the presence of the mobile device in a shopping facility;
   performing a criminal records check on the user based upon the demographic information included in the user profile, wherein an identity of the user is determined by communicating with a service provider's subscriber account data base or performing a reverse phone lookup;
   in response to receiving a user-generated request for advertising materials, determining if the mobile device is within a specified range of a store in the shopping facility by triangulating the signal of the mobile device using the plurality of femto cells, wherein the store is one of the plurality of stores associated with the user profile;
   responsive to the mobile device being within the specified range of the store in the shopping facility, retrieving advertising information associated with the store from a marketing database;
   transmitting the advertising information to the mobile device, wherein the advertising information includes an advertised item and a number of the advertised item available at the store;
   generating a marketing report using the demographic information associated with the user and information about items purchased by the user, wherein the marketing report breaks down the average costs of items by income level, race, and age; and
   providing the marketing report to at least one of the stores in the shopping facility.

2. The computer implemented method of claim 1, wherein the advertising information includes an electronic coupon.

3. The computer implemented method of claim 2, wherein the electronic coupon includes a scannable barcode.

4. The computer implemented method of claim 2, further comprising:
   determining whether the user uses the electronic coupon for purchasing an item at the store; and
   responsive to a determination that the user uses the electronic coupon for purchasing an item at the store, charging a fee to a company associated with the store.

5. The computer implemented method of claim 4, wherein the fee is a flat fee for the electronic coupon being used to purchase at least one item from the store.

6. The computer implemented method of claim 4, wherein the fee is a percentage of a sale associated with a purchase of one or more items at the store.

7. The computer implemented method of claim 4, wherein the fee is a periodic charge for placing advertising information associated with the store in the marketing database.

8. The computer implemented method of claim 4, further comprising maintaining a receipt database comprising an electronic receipt associated with items purchased using the electronic coupon, wherein the database is searchable by the user to retrieve the electronic receipt for returning at least one of the items purchased using the electronic coupon to the store.

9. A set of data processing systems for providing location based services to consumers, the set of data processing systems comprising: memory for storing computer usable program code;
   one or more processing units in communication with the memory, wherein the one or more processing units executes the computer usable program code to:
   register a mobile device associated with a user for the location-based services;
   create a user profile that includes a plurality of stores and interests associated with the user, wherein the user profile further includes demographic information associated with the user;
   monitor for the presence of the mobile device in a shopping facility using a plurality of femto cells placed at different areas of the shopping facility;
   in response to detecting the presence of the mobile device in a shopping facility; perform a criminal records check on the user based upon the demographic information included in the user profile; wherein an identity of the user is determined by communicating with a service provider's subscriber account data base or performing a reverse phone lookup;
   in response to receiving a user-generated request for advertising materials, determine if the mobile device is within a specified range of a store in the shopping facility by triangulating the signal of the mobile device using the plurality of femto cells, wherein the store is one of the plurality of stores associated with the user profile retrieve advertising information associated with the store from a marketing database; transmit the advertising information to the mobile device, wherein the advertising information includes an advertised item and a number of the advertised item available at the store;
   generating a marketing report using the demographic information associated with the user and information about items purchased by the user, wherein the marketing report
   breaks down the average costs of items by income level, race, and age; and providing the marketing report to at least one of the stores in the shopping facility.

10. The set of data processing systems of claim 9, wherein the advertising information includes an electronic coupon.

11. The set of data processing systems of claim 10, wherein the electronic coupon includes a scannable barcode.

12. The set of data processing systems of claim 10, wherein the one or more processing units further executes the computer usable program code to:
   determine whether the user uses the electronic coupon for purchasing an item at the store; and
   charge a fee to a company associated with the store in response to a determination that the user uses the electronic coupon for purchasing an item at the store.

13. The set of data processing systems of claim 12, wherein the fee is a flat fee for the electronic coupon being used to purchase at least one item from the store.

14. The set of data processing systems of claim 12, wherein the fee is a percentage of a sale associated with a purchase of one or more items at the store.

15. The set of data processing systems of claim 12, wherein the fee is a periodic charge for placing advertising information associated with the store in the marketing database.

16. The set of data processing systems of claim 12, wherein the one or more processing units further executes the computer usable program code to maintain a receipt database comprising an electronic receipt associated with items purchased using the electronic coupon.

* * * * *